(12) United States Patent
Tilove et al.

(10) Patent No.: US 8,450,633 B2
(45) Date of Patent: May 28, 2013

(54) METHOD AND SYSTEM FOR AUTOMATED SELECTION OF A SET OF CANDIDATE WELD GUNS INCLUDING ORIENTATIONS OF THE SELECTED GUNS

(75) Inventors: Robert Bruce Tilove, Rochester Hills, MI (US); Gopalakrishna Shastry, Karnataka (IN); Sandipan Bandyopadhyay, Chennai (IN); Ashish Gupta, Karnataka (IN); Narahari K. Hunsur, Karnatake (IN)

(73) Assignee: GM Global Technology Operations LLC, Detroit, MI (US)

( * ) Notice: Subject to any disclaimer, the term of this patent is extended or adjusted under 35 U.S.C. 154(b) by 1490 days.

(21) Appl. No.: 12/040,192

(22) Filed: Feb. 29, 2008

(65) Prior Publication Data

US 2009/0218329 A1 Sep. 3, 2009

(51) Int. Cl.
*B23K 11/00* (2006.01)

(52) U.S. Cl.
USPC .................................................. 219/117.1

(58) Field of Classification Search
USPC ............... 219/137 R, 86.41, 109, 110, 117.1
See application file for complete search history.

(56) References Cited

U.S. PATENT DOCUMENTS 5,493,093 A * 2/1996 Cecil .............................. 219/110
2004/0050827 A1* 3/2004 Aktas ......................... 219/117.1

\* cited by examiner

*Primary Examiner* — Tu B Hoang
*Assistant Examiner* — Brian Jennison

(57) ABSTRACT

The disclosure relates to the automatic selection of a set of candidate weld guns and candidate orientations for the weld guns from a library of existing weld guns. Minimum values for weld points and test orientations are calculated. The calculated minimum values are added to the library. As each point is added to the library, the set of weld guns that are candidates for the weld point at the tested orientation may be efficiently retrieved, and a matrix of candidate weld guns and orientations is produced.

20 Claims, 5 Drawing Sheets

|  | Op 1 | Op 2 | Op 3 | Op 4 | Op 5 | Op 6 | Op 7 |
|---|---|---|---|---|---|---|---|
| Gun 1 | ✓ | X | X | ✓ | X | ✓ | X |
| Gun 2 | X | X | ✓ | X | X | ✓ | X |
| Gun 3 | X | ✓ | X | ✓ | ✓ | X | ✓ |
| Gun 4 | X | ✓ | ✓ | X | X | X | ✓ |
| Gun 5 | ✓ | X | ✓ | X | ✓ | X | X |
| Gun 6 | X | ✓ | ✓ | X | ✓ | ✓ | X |
| Gun 7 | X | X | ✓ | X | X | ✓ | X |
| Gun 8 | X | ✓ | X | ✓ | ✓ | X | ✓ |
| Gun 9 | X | ✓ | ✓ | X | X | X | ✓ |
| Gun 10 | X | X | ✓ | X | ✓ | ✓ | X |

*FIG. 9*

METHOD AND SYSTEM FOR AUTOMATED SELECTION OF A SET OF CANDIDATE WELD GUNS INCLUDING ORIENTATIONS OF THE SELECTED GUNS

TECHNICAL FIELD

This disclosure relates to a procedure involving automatic selection of a set of candidate weld guns including the feasible orientations of the selected weld guns from a large set of weld guns.

BACKGROUND

Automotive body parts may be joined by spot welding operations. The assembly line in an automotive body shop has a series of stations in which welding operations are performed by robots or by human operators. The selection or design of a weld gun capable of performing a specified weld operation (i.e. a sequence of weld points) is one step in process planning and tool/equipment design in an automotive body shop. Typically, the process includes assigning welds to each weld operation and commencing steps to identify an existing weld gun that is capable of performing the operation. This involves validating both geometric (i.e. interference) constraints and weld processing constraints (e.g. welding current).

Weld guns may be selected based on weld process requirements and constraints (weld force, current and cycle time requirements) and weld gun accessibility constraints (size and shape of the weld gun). The processing and accessibility constraints of a weld gun depend on different modules of the weld gun. Basically, spot welding guns comprise different modules such as actuator modules, chassis modules, arm modules, power supply modules and dress package modules. These main modules further comprise a plurality of sub modules. For example, each arm module is an assembly of arms, holders, adapters and electrode caps. Each module has different parameters based on its suppliers, materials, manufacturing process, technology and size/shape. For example, an actuator can be air or servo type with different force ratings. The throat area of the weld gun may depend on the shape and size of the arm modules.

Identifying candidate weld guns from a potentially large library of existing weld gun designs is known to be a manual process aided by commercial software tools. Commercial software provide tools to assist the engineer to select suitable weld guns, however this process still involves a number of steps that are manual, error-prone, and incomplete.

SUMMARY

A method for selecting a candidate weld gun for a weld operation includes providing respective weld gun geometric constraints for a plurality of candidate weld guns. Respective weld point geometric constraints for a plurality of weld points in a weld process are provided. Valid weld guns are identified from the plurality of candidate weld guns for each of the plurality of weld points based on the respective weld gun geometric constraints and the respective weld point geometric constraints.

BRIEF DESCRIPTION OF THE DRAWINGS

One or more embodiments will now be described, by way of example, with reference to the accompanying drawings, in which:

FIG. 9 shows a matrix of candidate weld guns for all the operations in an exemplary zone in accordance with the present disclosure.

DETAILED DESCRIPTION

Figure 1:
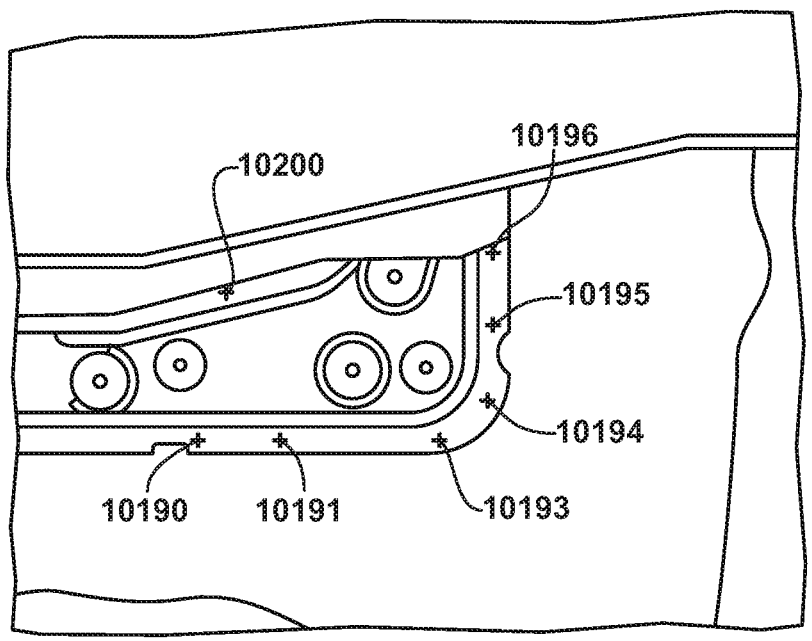
FIG. 1 shows a set of weld points assigned for a weld operation for which a single weld gun is to be selected to perform all the welds in accordance with the present disclosure.

An exemplary weld operation has a set of weld points. It is required to select a set of candidate weld guns that can perform these welds. FIG. 1 shows a workpiece with a set of exemplary weld points (10190, 10191, 10193, 10194, 10195, 10196, 10200) assigned to a weld operation. The process parameters such as force and current ratings for a candidate weld gun depend, for example, on the actuator and the power supply modules, and should satisfy the requirements for all the weld points. The minimum force and current values required for a weld within established tolerances depends on such non-limiting examples as material stack-up, material type, and material thickness of each material at the weld location. Accessibility of the weld gun depends on the geometric parameters of the weld gun and the shape and size of the workpiece along the weld gun approach angle.

Manufacturers have different standards in specifying weld gun modules. Different combinations of weld gun modules result in thousands of possible weld guns in a library. A manufacturer's specific library of weld guns may be classified based on process and geometric parameters and used for assigning weld guns for different weld operations during process planning.

Process related parameters such as force, current, etc. are computed based on such non-limiting examples as material stack-up, material type, and material thickness of each material at the weld location and processing time. A weld gun may approach a weld point from different angles. The shape and size of the weld gun (throat area) for a given approach angle depends on the geometry of the workpiece (including fixtures).

A single weld gun may be used for welding a set of welds in a sequence for performing a weld operation. And, a weld gun selected for performing a weld operation should be valid for all the welds assigned for the weld operation.

Figure 2:
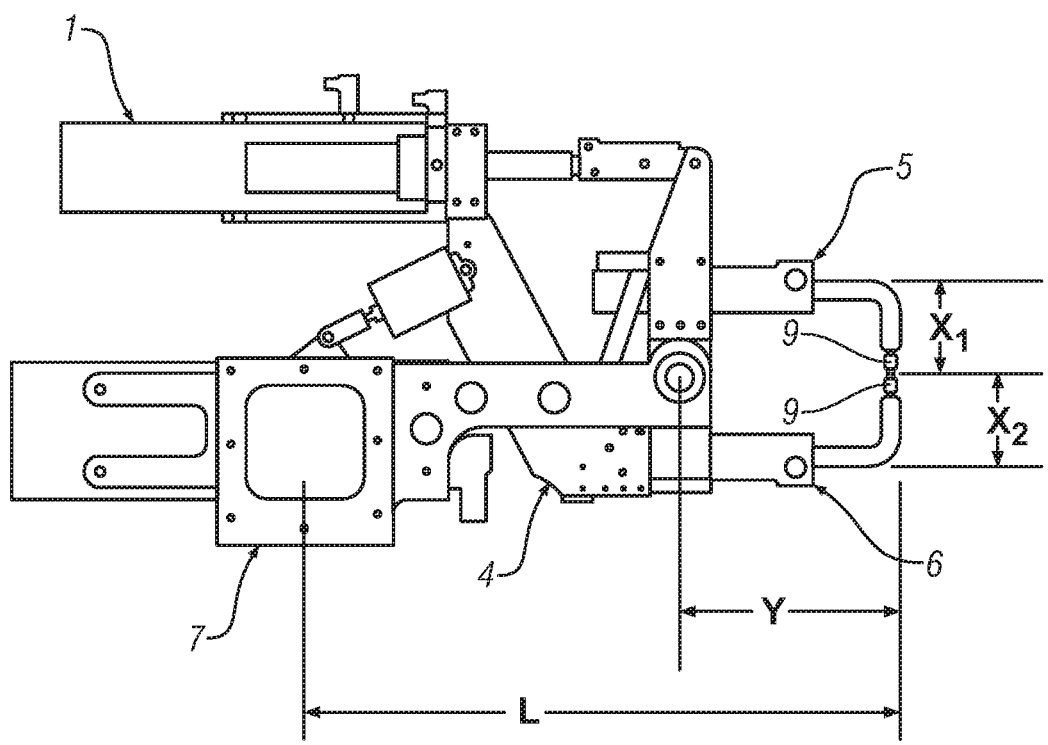
FIG. 2 shows exemplary weld gun modules and parameters in accordance with the present disclosure.

With additional reference to FIG. 2, different geometric parameters of an exemplary weld gun are shown. For a given chassis 4, arms 5 and 6 of different size, actuators 1 of different types, different transformers, mounting bracket 7 and different weld gun opening parameters (X1, X2, Y) may be specified. Different electrodes and holder shanks can be used depending on processing and accessibility requirements.

Figure 3:
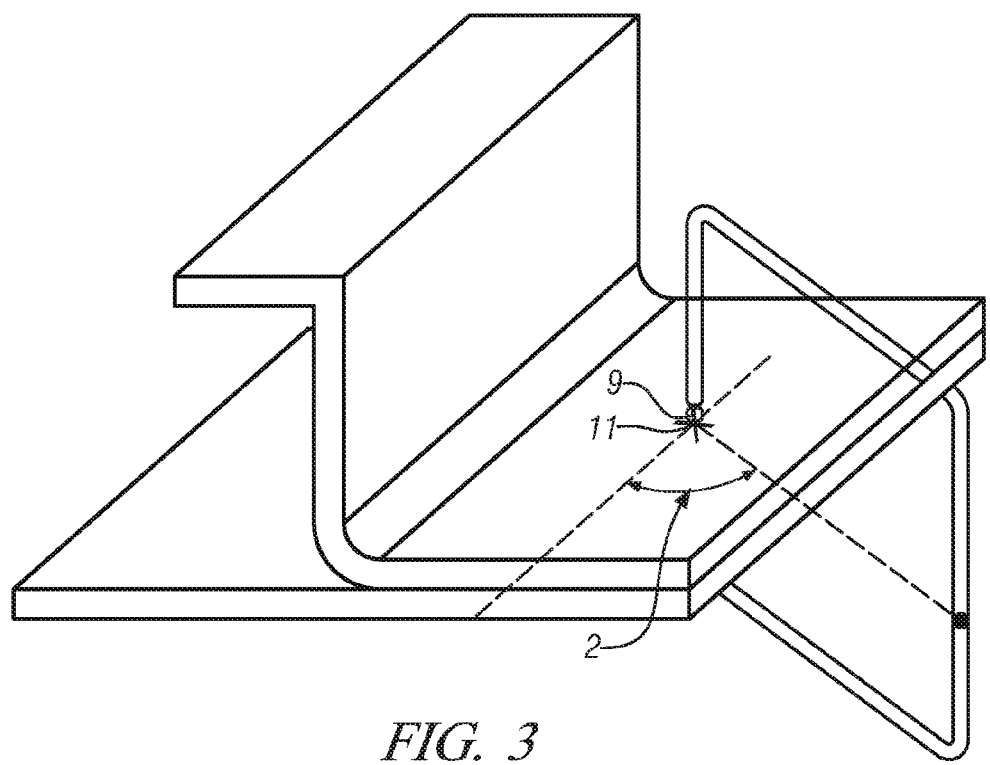
FIG. 3 is a schematic diagram illustrating a weld gun approach angle during welding of a weldable part in accordance with the present disclosure.

As shown in the schematic diagram of FIG. 3, during welding, the weld gun tips 9 will be in contact with the weld point 11 and the weld gun can approach a weld point from different approach angle orientations 2 (FIG. 3). The shape and size of an acceptable weld gun, in particular the throat area 3 (FIG. 4), and acceptable values for the approach angle orientation 2, depend on the geometry of the parts (with fixtures).

Figure 4:
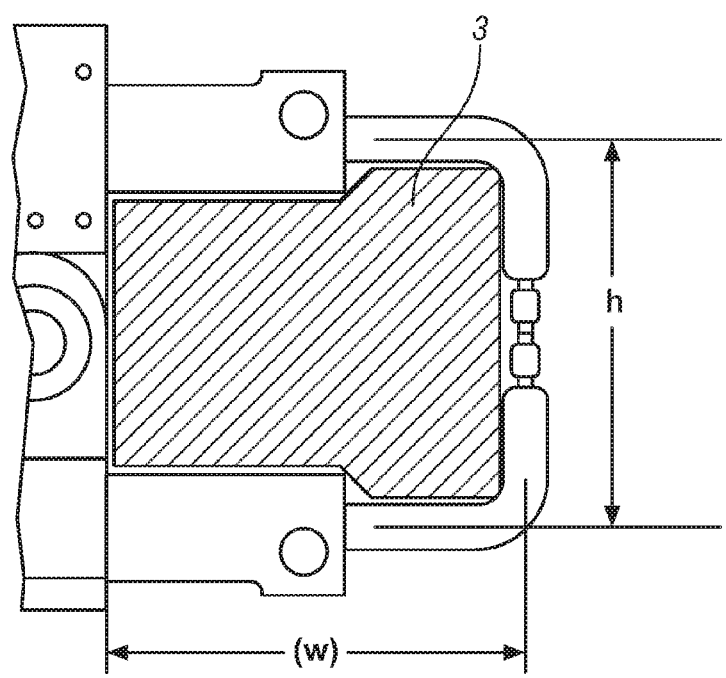
FIG. 4 shows exemplary parameters controlling geometric accessibility of a weld gun in accordance with the present disclosure.

Weld gun access to weld points is defined by geometric constraints of the weld gun. For example, the size of the throat area 3 of the weld gun is substantially defined by throat width (w) and throat height (h) parameters as shown in FIG. 4. Although these two throat parameters (w, h) are used in the present description, one having ordinary skill in the art will appreciate that the invention extends to an arbitrary number and type of geometric constraints of the weld gun defining interference limitations not only for the throat of the weld gun but also for any portion of the weld gun apparatus.

Figure 5:
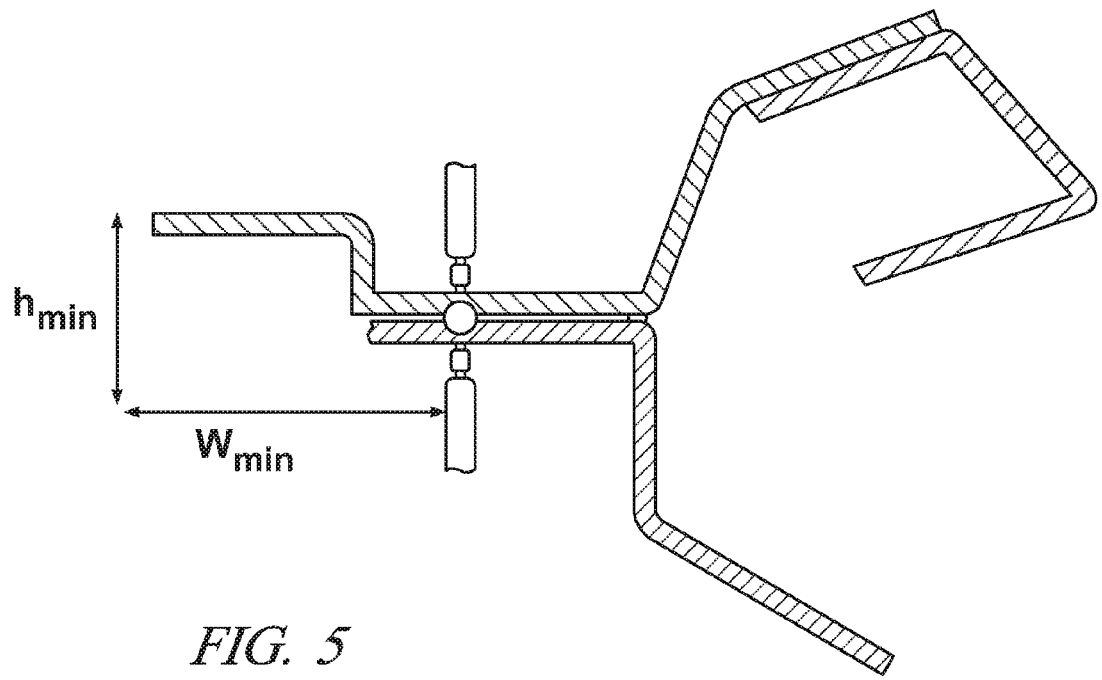
FIG. 5 shows the sectional geometry of the weldable part for a given weld gun approach angle in accordance with the present disclosure.
Figure 6:
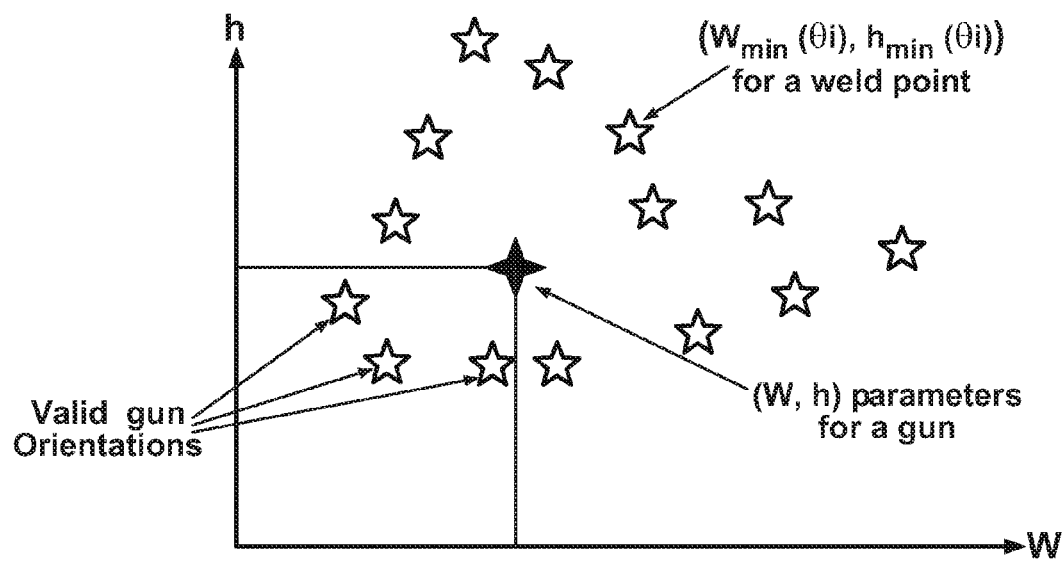
FIG. 6 a graphical representation of parameters relating to throat dimensions for an exemplary weld point in accordance with the present disclosure.

For a weld gun to access a weld point along a given approach angle orientation 2, the cross section geometry of the parts (with fixtures) needs to be contained within the throat area 3 of the weld gun (FIG. 5). For a given weld point, weld point geometric constraints including minimum values of throat parameters (w, h) along a given approach angle orientation $\theta_i$, represented as $w_{min}(\theta_i)$, $h_{min}(\theta_i)$, can be computed from the cross sectional geometry as shown in FIG. 5. As shown in a graphical representation in FIG. 6, a weld gun with throat parameters (w, h) can access a weld point along approach angle $\theta_i$ if $w_{min}(\theta_i) < w$ and $h_{min}(\theta_i) < h$.

Figures 7, 8:
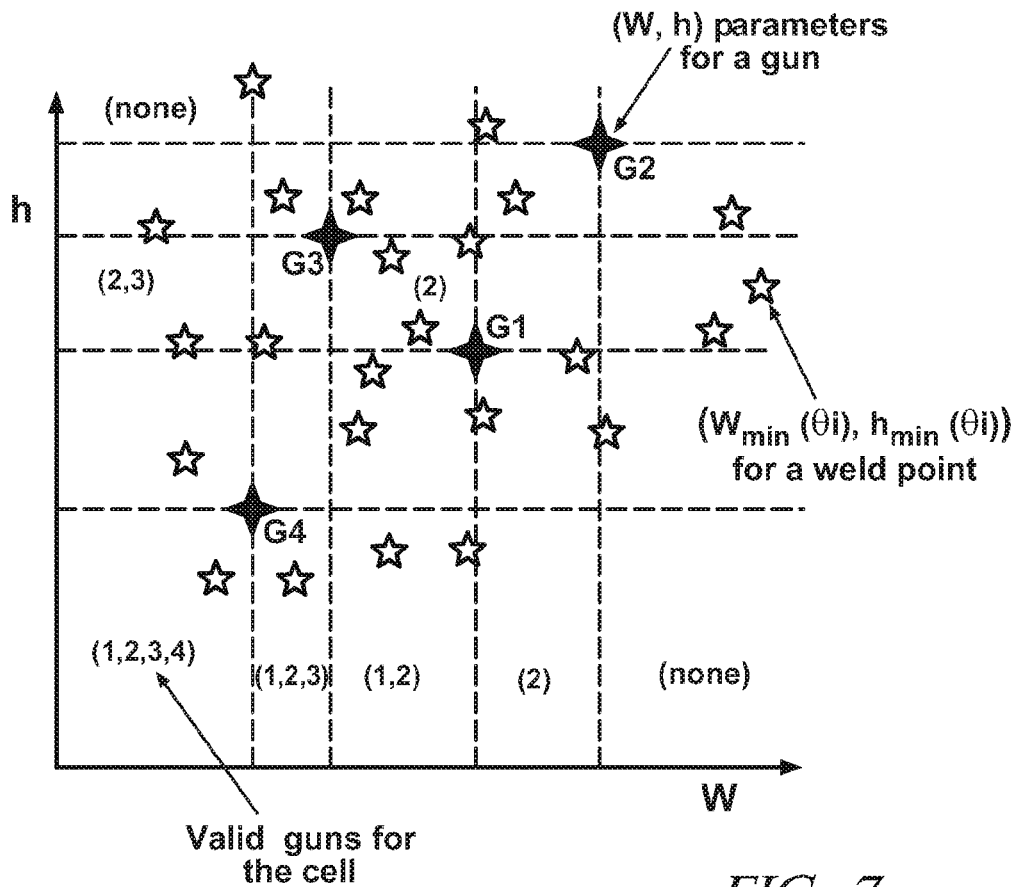
FIG. 7 shows a constructed k-d tree for weld guns in a library, based on parameters relating to throat dimensions for an exemplary weld point in accordance with the present disclosure.
FIG. 8 shows a matrix of candidate weld guns and orientations.

Based on weld point geometric constraints $w_{min}(\theta_i)$, $h_{min}(\theta_i)$ values for a weld point, the candidate set of weld guns can be obtained by searching for weld guns in the library based on their throat parameters (w, h). Well known k-d trees can be adapted for accelerating this search (FIG. 7). A k-d tree hierarchically divides the space into unique cells as shown in FIG. 7. Each cell is associated with a set of weld guns (G1, G2) whose throat parameter (w, h) values are greater than any point in the cell. Based on the $w_{min}(\theta_i)$, $h_{min}(\theta_i)$ value for a weld point, the k-d tree cell and the associated candidate weld guns (G1, G2, G3, G4) can be identified quickly.

The k-d tree is an exemplary approach to storing a set of points to allow efficient retrieval based on geometric proximity, but one having ordinary skill in the art will appreciate that other methods or data structures for accomplishing retrieval are within the scope of the present disclosure.

Using this disclosure, candidate weld guns for each orientation can be efficiently retrieved and a matrix of candidate weld guns and orientations may be produced (FIG. 8). An initial set of weld guns is selected from the weld gun library based on the process requirements for the weld points. A k-d tree is constructed for this set of weld guns from the library. For each orientation with a selected weld point $w_{min}(\theta_i)$, $h_{min}(\theta_i)$ values are computed. Candidate weld guns are identified from the k-d tree and stored in the matrix of candidate weld guns and orientations. The step is repeated for all the weld points in the weld operation.

When a weld gun is valid for at least one orientation for all the weld points it is valid for the weld operation. This approach results in a list of candidate weld guns for the weld operation. The candidate weld guns identified by this step require additional geometric validation, however this validation is limited to a smaller number of candidate weld guns and orientations as compared to other known techniques.

The disclosure can further be enhanced by incorporating specific rules or knowledge of the user to reduce the number of weld guns in the candidate set. For example the search space may be restricted to particular types or classes of weld guns (e.g. pinch weld guns, C-weld guns or servo weld guns) depending on, for example, a standard preference. When $w_{min}(\theta_i)$, $h_{min}(\theta_i)$ values are small all the weld guns may be valid. A smaller set of weld guns may be selected based on size or cost or any other suitable criteria.

This disclosure may be extended to identify the candidate weld guns for a set of weld operations in a zone or entire body shop. The candidate weld guns for the zone can be represented in the form of a matrix as shown in FIG. 9. Applying these data, the weld guns that can potentially be used for multiple weld operations can be identified and assigned a higher priority for further consideration. In this way, the number of distinct weld guns used in the plant may be minimized.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for selecting a candidate weld gun for a weld operation, comprising a computer executing the steps of:
   defining a weld operation comprising a plurality of weld points located about a workpiece, each weld point including a set of weld process parameters;
   identifying a plurality of weld guns operable to execute each of the weld process parameters;
   identifying geometric constraints for each of the weld guns;
   determining allowable weld gun approach angle orientations for each of the weld points;
   calculating weld gun geometric constraints for each weld gun approach angle orientation;
   creating a data structure comprising: the weld gun geometric constraints for each of the weld guns, a set of cells defining geometric proximity to the weld guns, and geometric constraints for each of the weld gun approach angle orientations;
   identifying a valid weld gun orientation comprising a weld gun approach angle orientation having geometric constraints within one of the cells defining geometric proximity to the weld guns; and,
   selecting a candidate weld gun comprising the weld gun having at least one valid weld gun orientation for each of the weld points within the set of cells defining the geometric proximity to the weld gun.

2. A method as claimed in claim 1, comprising comparing the input geometric constraints for a set of weld points with the set of cells defining geometric proximity to the weld guns to select the candidate weld gun.

3. A method as claimed in claim 2, wherein the data structure comprises a k-d tree space-partitioning data structure.

4. A method as claimed in claim 1, wherein the geometric constraints for the plurality of weld guns comprise the weld gun throat width and weld gun throat height.

5. A method as claimed in claim 4, wherein the weld gun geometric constraint for each weld gun approach angle orientation comprises the minimum weld gun throat area required for the gun to access the associated weld point when approaching from a given angle.

6. A method as claimed in claim 5, comprising computing the minimum weld gun throat area based on the cross sectional geometry of the workpiece and the weld gun approach angle orientation.

7. A method as claimed in claim 6, comprising identifying a valid weld gun orientation based upon the throat area parameters falling within one of the set of cells defining the geometric proximity to the weld guns.

8. A method as claimed in claim 7, wherein a weld gun is operable over a valid weld gun orientation within one of the cells defining geometric proximity to the weld guns when the throat parameters for the weld gun are larger than the valid weld gun orientation geometric constraints.

9. A method as claimed in claim 1, wherein each of the cells has a weld gun associated therewith comprising a unique region of space in which a geometric constraint for a weld point therein comprises a value less than the geometric constraints of the associated weld gun set.

10. A method as claimed in claim 1, wherein the weld process parameters comprise a minimum electrical current rating required to execute all welds in the operation and is computed based on at least one of material stack-up at the weld point, thickness of the workpiece material, material type and processing time.

11. A method as claimed in claim 1, wherein the weld process parameters comprise a minimum force rating required to execute all welds in the operation and is computed based on at least one of material stack-up at the weld point, thickness of the workpiece material, material type and processing time.

12. A method for selecting a candidate weld gun for a weld operation, comprising a computer executing the steps of:
   defining a weld operation comprising a plurality of weld points located about a workpiece, each weld point including a set of weld process parameters;
   identifying a plurality of weld guns operable to execute each of the weld process parameters;
   identifying geometric constraints for each of the weld guns;
   determining allowable weld gun approach angle orientations for each of the weld points;
   calculating weld gun geometric constraints for each weld gun approach angle orientation;
   creating a data structure comprising: the weld gun geometric constraints for each of the weld guns, a set of cells defining geometric proximity to the weld guns, and geometric constraints for each of the weld gun approach angle orientations
   programming the data structure into a data storage medium, and;
   comparing the input geometric constraints for the weld gun approach angle orientations with the set of cells defining geometric proximity to the weld guns to select the candidate weld gun comprising the weld gun having at least one of the geometric constraints for each of the weld points within the set of cells defining geometric proximity to the weld gun.

13. A method as claimed in claim 12, wherein the data structure comprises a k-d tree space-partitioning data structure.

14. A method as claimed in claim 12, wherein the geometric constraints for the plurality of weld guns comprise the weld gun throat width and weld gun throat height.

15. A method as claimed in claim 14, wherein the weld gun geometric constraint for each weld gun approach angle orientation comprises the minimum weld gun throat area required for the gun to access the associated weld point when approaching from a given angle.

16. A method as claimed in claim 15, comprising computing the minimum weld gun throat area based on the cross sectional geometry of the workpiece and the weld gun approach angle orientation.

17. A method as claimed in claim 12, wherein each of the cells has a weld gun associated therewith comprising a unique region of space in which a geometric constraint for a weld point therein comprises a value less than the geometric constraints of the associated weld gun set.

18. A method as claimed in claim 12, wherein the weld process parameters comprise a minimum electrical current rating required to execute all welds in the operation and is computed based on at least one of material stack-up at the weld point, thickness of the workpiece material, material type and processing time.

19. A method as claimed in claim 12, wherein the weld process parameters comprise a minimum force rating required to execute all welds in the operation and is computed based on at least one of material stack-up at the weld point, thickness of the workpiece material, material type and processing time.

20. A method for selecting a candidate weld gun for a weld operation, comprising a computer executing the steps of:
   providing respective weld gun geometric constraints for a plurality of candidate weld guns;
   providing respective weld point geometric constraints for a plurality of weld points in a weld process; and
   identifying valid weld guns from the plurality of candidate weld guns for each of the plurality of weld points based on the respective weld gun geometric constraints and the respective weld point geometric constraints.

* * * * *